United States Patent [19]

Hufnagel

[11] Patent Number: 4,803,756
[45] Date of Patent: Feb. 14, 1989

[54] HINGE PIN RETAINING ASSEMBLY HAVING AN INTEGRAL SLOTTED PLATE AND HINGE PIN

[75] Inventor: Nick L. Hufnagel, Tequesta, Fla.

[73] Assignee: United Technologies Corporation, Hartford, Conn.

[21] Appl. No.: 157,004

[22] Filed: Feb. 17, 1988

[51] Int. Cl.⁴ .............................................. E05D 7/10
[52] U.S. Cl. ........................................ 16/252; 16/263; 16/264; 16/270; 16/380; 16/382; 16/386
[58] Field of Search ................. 16/240, 245, 246, 252, 16/262, 263, 264, 267, 270, 271, 367, 380, 381, 382, 386, DIG. 43

[56] References Cited

U.S. PATENT DOCUMENTS 3,203,030  8/1965  Barnes .............................. 16/252 X
4,613,998  9/1986  Drexhage ............................. 5/136

FOREIGN PATENT DOCUMENTS 2515054  10/1976  Fed. Rep. of Germany ........ 16/382

Primary Examiner—Fred A. Silverberg
Attorney, Agent, or Firm—Edward L. Kochey, Jr.

[57] ABSTRACT

Stud 14 is secured to member 10 with hinge arm 20 slidable thereon and carrying knuckle 30. Pin structure 32 includes pin 34 engaging knuckles 24 and 30. Slotted plate 36 secured to the pin engages stud 14 and is retained thereby.

2 Claims, 2 Drawing Sheets

HINGE PIN RETAINING ASSEMBLY HAVING AN INTEGRAL SLOTTED PLATE AND HINGE PIN

The Government has rights in this invention pursuant to a contract awarded by the Department of the Air Force.

DESCRIPTION

1. Technical Field

The invention relates to hinges and in particular to a floating hinge with a nonrotating easily removable and reusable pin.

2. Background of the Invention

In aircraft engines seal plates cover the interface between adjacent flaps of convergent/divergent nozzles. The angle between the convergent flaps and the divergent flaps is adjustable during operation. Accordingly, the seal plate covering the interface between adjacent flaps must also adjust between the convergent and divergent portions. For this reason, the seal plates of the convergent and divergent sections are hinged to each other.

Vibration is known to cause wear in a floating hinge pin. Therefore, nonrotating pins are desirable for use in aircraft engines.

The divergent flap in particular experiences high temperatures and the seal plate is subject to deterioration. It is therefore required to periodically replace the seal plate. The hinge pin should be easily removable and reusable.

SUMMARY OF THE INVENTION

The seal plate of the convergent nozzle has a stud secured to and perpendicular to its surface. The hinge arm slideably engages the stud and has a first hinge knuckle extending from the axis of the stud toward the divergent flap. A second hinge knuckle is secured to the divergent flap and interlockable with the first knuckle.

A pin structure has a pin passing through and engaging the first and second knuckles with the pin being rigidly secured to a plate. This plate has a slot opening outwardly from the axis of the pin whereby after passing the pin through the knuckles the plate may be rotated so that the slot engages the stud. A locking nut on the end of the stud secures both the hinge arm and the plate to the stud.

The hinge pin, accordingly, is nonrotatable during operation. It may be easily removed by removing the nut, rotating the plate around the hinge pin, and withdrawing the hinge pin. Since no deformation is required to secure the pin in place, it is reusable whenever replacing or removing the divergent flap seal for repair.

DESCRIPTION OF THE PREFERRED EMBODIMENT

Figure 1:
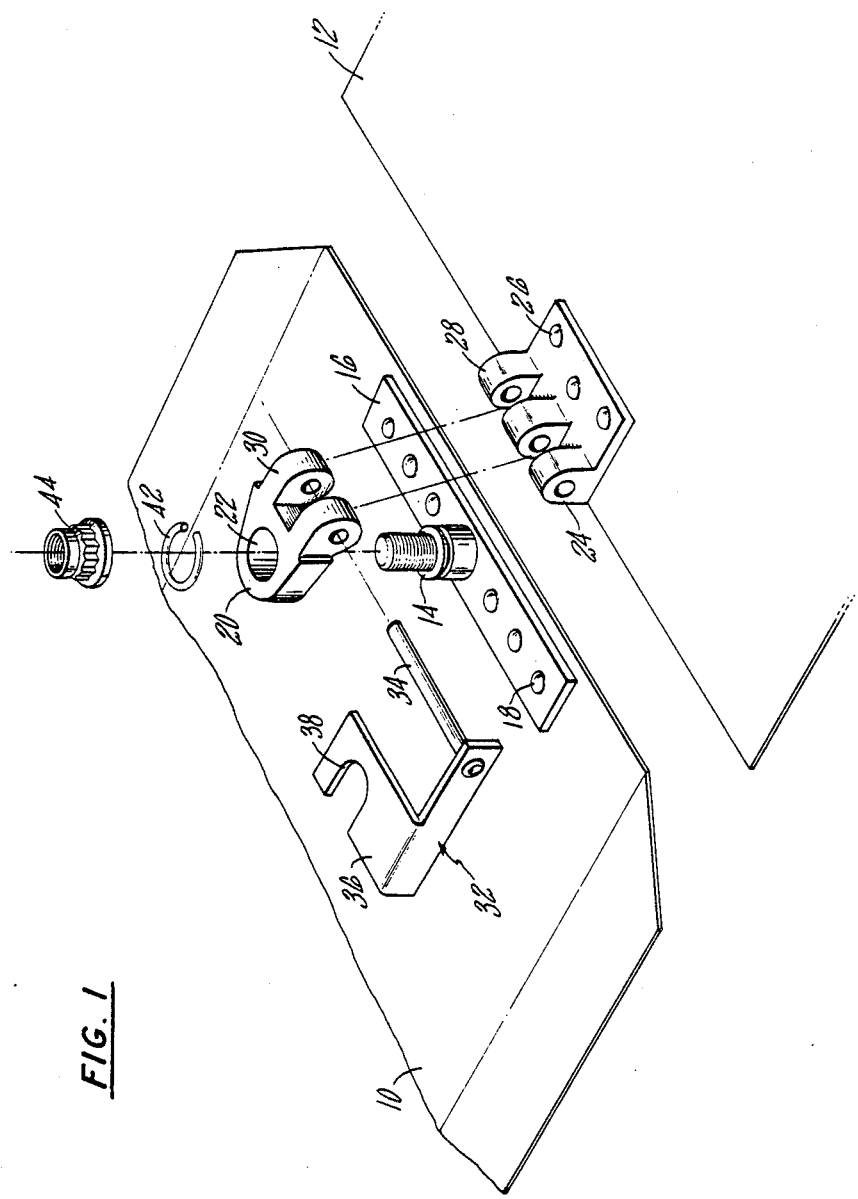
FIG. 1 is an exploded view of the hinge assembly.

A first member in the form of a convergent flap seal 10 is to be pivotally secured to a second member in the form of a divergent flap seal plate 12. A stud 14 is secured with its axis perpendicular to member 10 by being secured to hinge base 16 which in turn may be riveted with rivets 18 to seal plate 10.

A hinge arm 20 has a cylindrical opening 22 therethrough which is slideable and rotatable on stud 14. In assembling the hinge assembly, the hinge arm 20 is moved downwardly toward hinge base 16.

Seal plate 12 has knuckle 24 secured thereto by rivets 26. The width and spacing of knuckle portions 28 are so related to knuckle portions 30 of the first knuckle as to fit between and be interlockable therewith.

With the knuckles so interlocked, pin structure 32 carrying pin 34 passes through and pin 34 engages the knuckles. Plate 36 which is rigidly secured to the pin has a slot 38 which is oriented perpendicular to and opening away from pin 34. With the pin inserted through the knuckles the plate may be rotated from a substantially vertical position to a horizontal position where slot 38 engages stud 14. A retaining C-ring 42 engages stud 14 to retain hinge arm 20 during assembly. A self-locking nut 44 is secured to the end of the stud retaining both the hinge arm 20 and the plate 36 of the pin structure 32.

Figure 2:
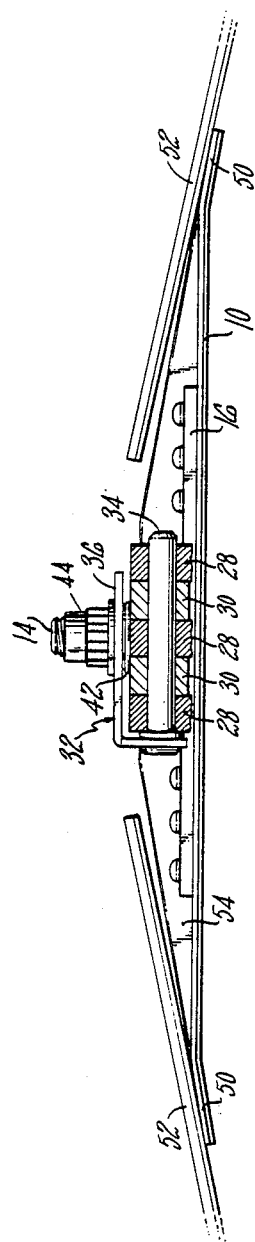
FIG. 2 is a view of the assembled hinge.

FIG. 2 illustrates the seal plate 10 with its edges 50 bearing against convergent flaps 52. The seal plate 10 has a corrugated section 54 therein providing stiffening through the bulk of its length while leaving the ends flexible. Knuckles 30 engage hinge pin 34 which in turn engages knuckles 28. The C-ring 42 is shown holding the hinge arm 20 in place with locking nut 44 securing the plate 36.

The hinge pin 34 is nonrotatable during operation because of its rigid connection to plate 36 which is secured in place. The pin may easily be removed by removing nut 44 and rotating the plate upwardly, so that the pin may be directly withdrawn. The hinge member 20 is rotatably supported on stud 14 thereby permitting vibrational rotation around stud 14 without imposing loading on plate 16, which loading has been known to destroy the riveted connections. Seal plate 12 is restricted from extensive movement by stops not shown, but the floating feature around stud 14 prevents vibration from destroying the connections to the adjacent seal plates

I claim:

1. A hinge assembly for securing first and second members comprising:
   a stud secured to and perpendicular to the surface of said first member;
   a hinge arm slideably engaged with said stud and having a first hinge knuckle extending outwardly from the axis of said stud;
   a second hinge knuckle secured to said second member and interlockable with said first knuckle;
   a pin structure having a plate and a pin rigidly secured to said plate, said pin passing through and engaging said first and second knuckles, said plate having a slot engaging said stud; and
   locking means secured to the end of said stud for retaining both said hinge arm and said plate to said stud.

2. A hinge assembly as in claim 1:
   said plate having said slot oriented perpendicular to said pin axis and opening away from said pin, whereby on rotation of said pin structure around said pin, said slot engages said stud.

* * * * *